Dec. 9, 1930.  J. J. PAUGH  1,784,384

WATER COOLED WELDING CABLE JOINT CONSTRUCTION

Filed April 29, 1929

INVENTOR.
JAMES J. PAUGH
BY
ATTORNEY.

Patented Dec. 9, 1930

1,784,384

UNITED STATES PATENT OFFICE

JAMES J. PAUGH, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WATER-COOLED WELDING CABLE-JOINT CONSTRUCTION

Application filed April 29, 1929. Serial No. 358,825.

My invention relates to a joint construction for water-cooled electric welding cables, and while certain of the features thereof are applicable to such joints generally, the novel joint construction of my invention is more particularly applicable to the end joint of the cable connecting it to the welding head carrying the welding point. The invention relates in its more particular aspects to the provision of such a joint which will readily permit the attachment or detachment of the welding head and a joint which is readily accessible for cleaning and repair, and one which permits the free circulation of the cooling fluid, one which is of a compact and neat appearance and of light construction; one which permits the ready substitution of different types of welding heads on the end of the same cable, and one which insures longer life of the cable at the point where it is joined to the welding head or to another length of cable.

It has heretofore been the practice to permanently connect the welding cable directly to the welding head either by soldering or otherwise, and to provide a more or less tortuous passage from the cooling fluid conduit associated with the cable to the welding point. This made it necessary to disrupt the joint if a different welding head was to be used or if the tortuous passage became clogged. Also the welding cable where it joined the head, was liable to be bent sharply at this point and this led in a short time to a breakage of the cable at these points. All of these objectionable features have been overcome by my novel improved joint construction which forms the subject of my present invention.

One embodiment of the invention is shown in the accompanying drawings, in which

Figure 1:
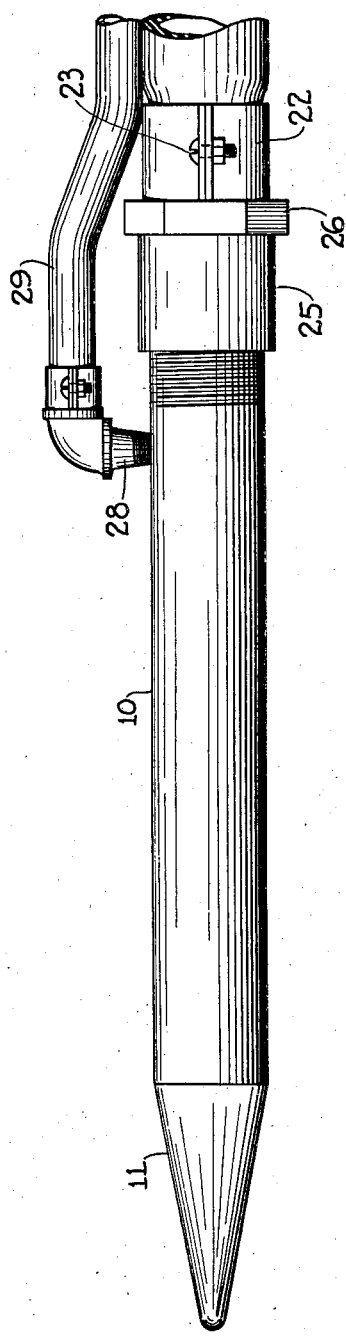
Fig. 1 is a side elevational view of the improved joint construction as applied to the end of a water cooled electric cable where it is joined to a welding head carrying the welding point.
Figures 2, 3:
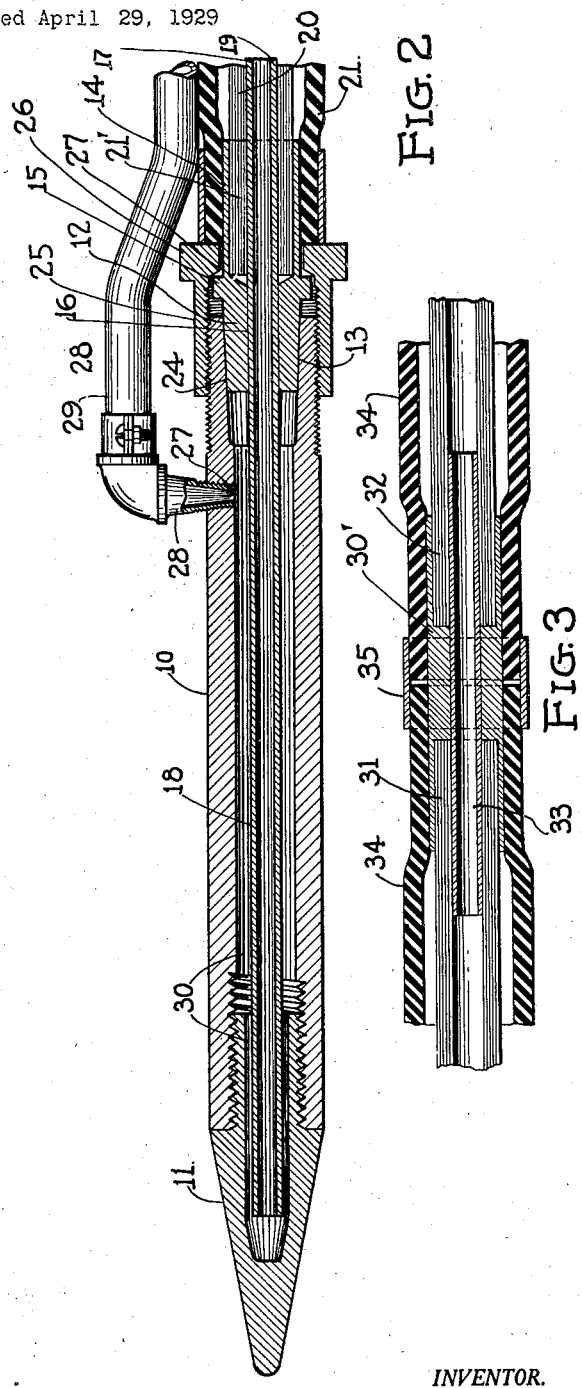
Fig. 2 is a longitudinal cross sectional view of the parts shown in Fig. 1.
Fig. 3 is a cross-sectional view of the plug forming a part of my improved joint when applied to a joint connecting the adjacent ends of two lengths of welding cables.

In the application of my invention shown in Figs. 1 and 2, the joint is constructed to permit a readily detachable yet fluid tight connection between the hollow welding head 10, carrying the removable welding point 11, and the cable to permit the easy substitution therefor of another welding head, thus giving greater usefulness to the machine with which the head and cable are used because of its adaptation to a greater latitude of work permitting the change to be almost instantly made, thereby keeping the machine almost constantly in operation.

An important feature of the invention consists in the provision of a plug or core member 12 formed at one end thereof with a tapered frusto-conical seat 13 and at the other end with a cylindrical part 14. In this embodiment of the invention the plug is formed intermediate the portions 13 and 14 with a collar 15.

The cylindrical end of the plug is counterbored as at 15 with a relatively large bore, and from the bottom of said bore 15 to the opposite end it is formed with a smaller bore 16. A tube 17 is then driven into the bore 16, the tube having end portions 18 and 19 projecting at each end beyond the body of the plug 12 and forming extensions thereof for a purpose to be presently described. The tube 17 forms in effect a substantially straight conduit for the passage of the cooling fluid, and is formed as a separate part from the plug 12 only for convenience of manufacture. The end 18 thereof may extend into the hollow point 11 to deliver the cooling fluid near the point where the heat is generated, and the end part 19 extends beyond the joint between the cable 20 and thereby assists in preventing any sharp bending of the cable and cooling fluid conduit associated therewith at that point, and thus prolongs the life of those parts.

The cable 20 may consist, as usual, of a plurality of strands of copper wire or other wire of high conductivity to give it flexibility, and the end thereof is firmly secured in the annular space 21' between the cylindrical shell 14 of the plug and the tubular extension 17, as by soldering or otherwise.

The water conduit 21 associated with the cable may be a flexible hose of rubber or other suitable composition having its end secured to the outer side of the cylindrical portion 14 of the plug 12 in a usual manner, as by the metal clamp 22, the ends of which are drawn together to compress it over the portion 14 of the plug by a bolt, as 23.

The head 10 has its end adjacent the plug 12 formed with a tapered internal seat 24, which fits over the tapered seat 13, and when the parts are tightly forced together forms therewith a fluid tight joint, and also a good electrical connection between the plug and the head. To draw or force the plug and head firmly together on these telescoping tapered seats 13 and 24, I employ a nut 25, having a non-circular portion 26 to be engaged by the jaws of an ordinary wrench and an inwardly projecting annular collar 27 engaging behind the collar 15 on the plug 12. The outer end or the end of the nut projecting toward the head 10 is cylindrical in form and is interiorly screw threaded to engage the screw-threaded rear end of the detachable head. From this construction it will be obvious that the head 10 can be tightly drawn up with its conical seat 24 in engagement with the conical seat 13 on the plug 12 or backed off as described, by turning the nut in one or the other direction. The collar 27, being located between the collar 15 on the plug and the end of clamping ring 22, prevents endwise movement of the nut.

To complete the cooling fluid circulating system through the head and joint, the head is provided near its joint end with a port 27, threaded to receive a nipple 28 connected with a small flexible return conduit 29. Thus the water or other cooling fluid circulation can freely proceed either from the conduit surrounding the cable through the conduit provided by tube 17 to the welding point 11 and return through the space 30 provided between the welding point 11 and head 10 and tube 17 to the orifice or port 27 and from thence to the return conduit 29 or vice versa.

It will be seen that by this construction an open conduit for the circulation of the cooling fluid is provided, which is not likely to become obstructed, but if it should become obstructed, one which can be readily cleaned by removing the welding head. The welding head being readily removed, can be quickly replaced, and thus the machine with which it is used can be kept in almost uninterrupted operation. Because of the free circulation of the cooling fluid insured by my invention, the welding point can be kept at a lower temperature, and will thus be subject to less wear, requiring less frequent sharpening of the point and less frequent replacement. The end 19 of the tube projecting beyond the connection of the flexible conduit surrounding the cable and the cable with the plug prevents sharp bending of these parts at the connection and thereby avoids breakage thereof at this place and conserves their life.

In the modification of my invention shown in Fig. 3, I have applied the improved plug to the connection of two lengths of cable, an application useful in repairing a worn cable or in lengthening the cable, as desired. The plug 30' is there shown of generally cylindrical form from end to end and counterbored at each end to receive the adjacent ends 31 and 32 of the cable sections, and the central tube 33 is shown extended at each end a distance beyond the end of the body of the plug, similar to the end 19 in Figs. 1 and 2, and for a like purpose. The adjacent ends of the cooling fluid conduit sections 34 enclosing the cable may be secured over the plug in water-tight relation thereto by a suitable clamp or clamps as 35.

While I have herein disclosed specific applications of my invention, it will be understood that it is capable of application in other modifications and arrangements, which will be apparent to those skilled in this art, and I desire to include such within the scope and meaning of the appended claims.

What I claim is:

1. In a welding apparatus, the combination with a flexible conducting cable and a tubular welding head of a plug removably receivable in adjacent ends of said cable and head and adapted to electrically connect said elements together, said plug having a bore extending therethrough providing a water conduit between said cable and said head.

2. A joint for flexible water-cooled electric welding cables comprising a plug having a removable reduced extension at at least one end thereof, said member and extension having a substantially straight conduit for cooling fluid extending therethrough, a conductor cable secured to one end of said plug and conduit means associated with said cable for permitting cooling fluid to flow along said cable and operatively connected with said first-named conduit.

3. A joint for flexible water-cooled welding cables comprising a removable plug having substantially straight conduit therethrough for the passage of cooling fluid, a conductor cable having a fluid conveying conduit associated therewith connected to one end of said plug, a hollow head removably connected to the other end of said plug, an orifice leading from said head, and a conduit connected with said orifice.

4. A joint for water-cooled welding cables comprising a plug having a substantially straight conduit through it for the passage of cooling fluid, a conductor cable having a fluid conduit associated therewith connected to one end of said plug, the opposite end of said plug being provided with a tapered seat, a member having a conduit for communicating with the conduit associated with said cable through the conduit in said plug, said member having its end formed for telescopic engagement with said tapered seat, and means for drawing and holding said tapered seats in firm engagement.

5. A joint for water-cooled welding cables comprising a plug having a reduced extension from each end thereof, said plug and its extensions being formed with a substantially straight conduit therethrough, a welding cable secured to one end of said plug at a point surrounding one of said extensions, said cable having a cooling fluid conduit associated therewith communicating with the afore-mentioned conduit, and means detachably securing a hollow welding head to the other end of said plug into which the other of said extensions projects, and a port leading from said detachable welding head forming a part of the fluid circulating system formed by said conduits and hollow head.

6. A removable metallic plug adapted for use in a flexible welding cable joint, comprising a body portion counter-bored at at least one end and having a reduced opening extending from the bottom of said counter-bore and communicating with the opposite end of the plug, and a tube tightly fitting said reduced opening and forming a passage for cooling fluid through the plug.

7. A metallic plug adapted for use in a welding cable joint comprising a body portion formed with an enlarged recess at one end, and having a reduced portion extend from the bottom of the recess and provide an annular space between the outer wall of the recess in said body portion and the reduced extension for the reception and securement therein of the end of a welding cable, said plug and reduced extension being formed with a substantially straight conduit from end to end to provide a passage for a cooling fluid.

8. A joint for water-cooled welding cables comprising a plug having a body portion formed at one end with a recess and a reduced extension extending longitudinally from the bottom of said recess some distance beyond the adjacent end of the body of the plug, and a welding cable having a cooling conduit associated therewith secured to the body portion of the plug in the annular space between the outer wall of said recess and the reduced extension, said plug and extension being provided with a substantially straight conduit for cooling fluid extending therethrough and communicating with the conduit associated with said cable.

9. In a welding apparatus, the combination with a flexible conducting cable and a tubular welding head of a plug having a reduced extension on one end thereof, said plug and extension having a conduit of cooling fluid extending therethrough, said extension extending into said flexible conducting cable, said plug and extension being adapted to electrically connect said cable and head together.

10. In a welding apparatus, the combination with a flexible conducting cable having a flexible water conduit surrounding the same and a tubular welding head, of a plug member removably receivable in adjacent ends of said conduit and head and adapted to electrically connect said cable with said head, said plug having a bore extending therethrough and providing a passageway between said water conduit and head.

11. In a welding apparatus, the combination with a flexible conducting cable having a surrounding water conduit and a tubular welding head, of a plug member having a reduced extension extending into said cable and water conduit, said plug and extension providing an electrical connection between said cable and welding head, there being a passageway extending through said head communicating said water conduit with the interior of said head.

12. In a welding apparatus, the combination with a flexible conducting cable having a surrounding flexible water conduit susceptible to breakage upon assuming a pre-determined maximum curvature and a tubular welding head, of a plug member having a reduced extension extending into said head and extending into said conduit a distance in excess of the radius of said maximum curvature, said plug member being receivable in said head and forming an electrical contact between said cable and head, there being a bore extending through said plug member and extension forming a passageway between the interior of said conduit and said head.

13. In a welding apparatus comprising a pair of tubular members adapted to be connected together at their ends and including a flexible conducting cable having a flexible water conduit surrounding the same, of a plug member removably receivable in the adjacent ends of said members and adapted to electrically connect said members together, said plug having a bore extending therethrough providing a passageway between said members.

In testimony whereof I hereunto affix my signature.

JAMES J. PAUGH.